Feb. 1, 1927. 1,616,184
T. R. GRIFFITH
ELECTRON DISCHARGE DEVICE
Filed Oct. 29, 1923
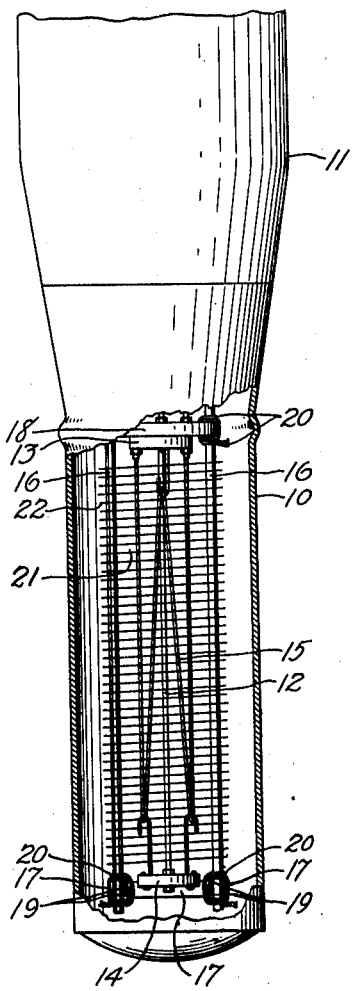
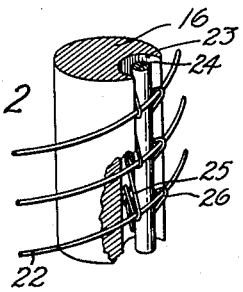
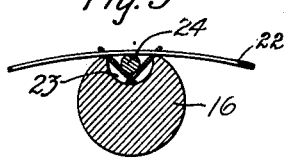
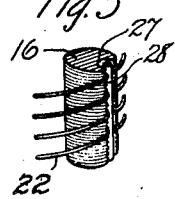
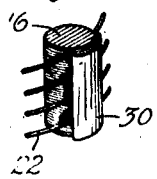
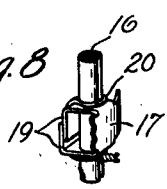
Inventor:
Thomas R. Griffith,
by E. W. Adams Atty Patented Feb. 1, 1927.

1,616,184

UNITED STATES PATENT OFFICE.

THOMAS R. GRIFFITH, OF DOVER, NEW JERSEY, ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed October 29, 1923. Serial No. 671,316.

This invention relates to electron discharge devices, more especially, to devices of this character capable of handling large amounts of power, and has for its object to improve the electrode supporting structure thereof.

This object is attained by providing a framework comprising a plurality of rods connected together by a plurality of collars. A fine wire is wrapped around the rods, each turn of the wire being supported by each of said rods through the medium of clamping means attached to the rods by the collars.

Referring now to the drawings, Fig. 1 discloses an electron discharge device, partially broken away, embodying the invention, and Figs. 2 to 8, inclusive, are detail views of fastening means.

The enclosing vessel of the device comprises a metallic cup-shaped member 10 to the rim of which is fused a glass portion 11, the portion 10 serving as the anode of the device. A rod 12 is supported from the stem of the device (not shown) and extends into the anode. Attached to this rod are a pair of insulating blocks 13 and 14 between which is supported the filament 15.

A plurality of rods 16 preferably three in number are supported from the stem of the device (not shown) and extend substantially the full length of the anode 10. At their free ends the rods are connected together by means of a ring or collar 17 and are likewise connected near the rim of the anode by a similar collar 18. Each of the collars is provided with a pair of inwardly projecting flaps 19, in each of which flaps is provided an aperture to receive a rod 16. The inner ends of the flaps 19 are bent parallel to the surface of the collar to form a substantially box-shaped member through which a rod 16 extends. A wire 20 is passed around each rod 16 over the flaps 19 and back again around the rod 16, to the opposite side of the box-like portion, where the ends are twisted together to tie the collar securely to the rod 16. A wire helix 22 surrounds the rods 16 forming a grid electrode 21, each turn of the helix being attached to each rod.

According to the disclosure in Figs. 2 and 3, a longitudinal groove 23 is provided in each rod 16. Arranged in each of these grooves is a smaller rod 24 to which are attached the turns of the helix 22 by means of a pair of interlinked sinusoidal tie wires 25 and 26 according to the disclosure in the application of W. G. Houskeeper, Serial No. 597,748, filed October 30, 1922. The ends of the rod 24 pass under the collars 17 and 18 and are clamped in place by the collars.

An alternative method of supporting the turns of the helix from the rods 16 is disclosed in Figs. 4 and 5. Here again a groove 27 is provided in each rod 16, but the groove in this instance is smaller than in the former. A rod 28 is also provided to clamp the turns of the wire to the posts, the rod 28 being pressed into the groove 27, forcing a portion of each turn of the helix into the groove and clamping said portion between it and the bottom of the groove. Each of the rods 16 is screw threaded to provide grooves to lay the turns of the helix 22 for determining the space relation between them. The rods 28 are held in the grooves by being passed under the collars 17 and 18.

Still another type of connection is disclosed in Figs. 6 and 7. According to this disclosure the rods 16 are not grooved but are screw threaded throughout their length. The turns of the helix are laid in the threads to determine their space relation, and a curved clamping member 30 laid over them to hold them in the threads. This clamping member is held in place by having its ends pass through the apertures in the flaps 19 of the collars 17 and 18.

What is claimed is:

1. A grid electrode comprising a plurality of grooved supporting rods, a wire helix surrounding said rods, means lying in said grooves and extending the full length thereof for attaching the turns of the helix thereto, and a pair of collars connecting said rods and holding the ends of said attaching means in said grooves.

2. A grid electrode comprising a plurality of supporting rods, a pair of collars, aligned projections extending from the edges of said collars, each of said projections being apertured to receive a supporting rod, the end of each projection of said pairs of projections being bent toward the projection aligned therewith, a tie wire passing around each of said supporting rods and over said projections, and a wire helix surrounding said supporting rods and supported thereby.

3. A grid electrode comprising a plurality of grooved supporting members, a wire helix surrounding said members, a rod arranged in each of said grooves, tie wires for attaching each turn of said helix to said rods, and a pair of collars connecting said supporting members and clamping said rods in said grooves.

4. A grid electrode comprising a plurality of grooved supporting members, a wire helix surrounding said supporting members, a rod clamping a portion of each turn of said helix in the groove of one of said supporting members and a pair of collars connecting the supporting members and clamping said rods in said grooves.

In witness whereof, I hereunto subscribe my name this 26 day of October A. D., 1923.

THOMAS R. GRIFFITH.